E. T. Wheeler,
Sawing Shingles,
N°28,798. Patented June 19, 1860.

Witnesses:
J. W. Coombs
R. S. Spencer

Inventor:
E. T. Wheeler
per Munn
Attorneys

UNITED STATES PATENT OFFICE.

E. T. WHEELER, OF CANNELTON, INDIANA.

SHINGLE-MACHINE.

Specification of Letters Patent No. 28,798, dated June 19, 1860.

*To all whom it may concern:*

Be it known that I, E. T. WHEELER, of Cannelton, in the county of Perry and State of Indiana, have invented a new and Improved Machine for Sawing Shingles or Slabs for Boxes; and I do hereby declare that the following is a full, clear, and exact description thereof, reference being had to the accompanying drawings, forming a part of this specification, in which—

Figure 3:
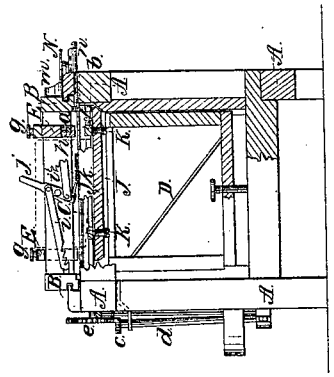
Figure 1:
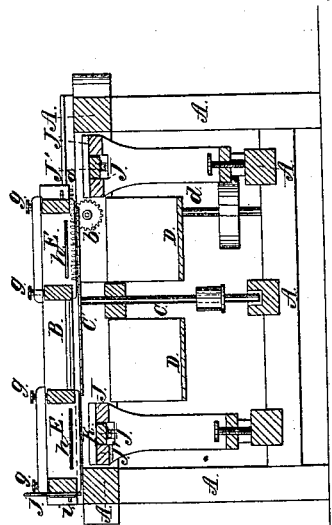
Figure 2:
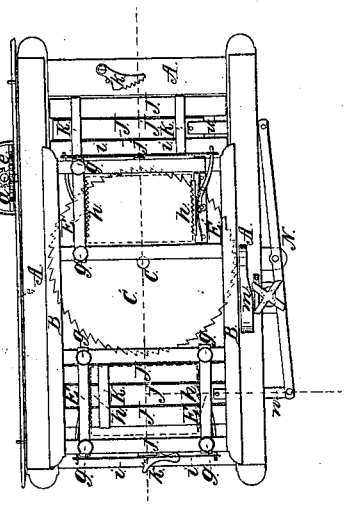

Figure 1, represents a vertical longitudinal section through machine from front to rear. Fig. 2, is a plan view of the machine in which the bolts are represented in their place, one of which is represented as being cut by the saw. Fig. 3, is an elevation of one end of the machine with a portion cut away to represent clearly the mechanism for clamping and operating the several parts for cutting shingles.

Similar letters of reference indicate corresponding parts in the three figures.

The object of this invention is to obtain a machine which will be automatic in its operation for sawing off shingles or slabs for boxes, in which the bolts will be fed up to the saw in a suitable manner for cutting shingles, they will be gaged and set properly for cutting either shingles or plain boards of any width or varying in width. It will only be necessary to clamp the bolts from which the shingles are to be cut in their places, set the machine in operation and they will be cut up without further setting or adjusting. The arrangement of the several parts, and the parts themselves will be simple and strong and the work can be performed with rapidity and neatness.

To these ends my invention consists, firstly, in arranging within a carriage having a reciprocating movement over the bed of a frame in the center of which is placed a horizontal circular saw, and two sets of clamps for alternately confining and releasing the bolts at each movement of the carriage, as will be hereinafter described, the same being made suitably adjustable for bolts of different sizes; and in conjunction therewith it consists in the arrangement at each end of the machine and in a suitable relation to the clamps and head blocks, of an adjustable table for receiving the bolts when they are released by the clamps, holding and gaging them for the clamps to grasp them again in the manner hereinafter to be described.

Secondly, my invention consists in combining with the adjustable tables two reciprocating blocks which are operated by the reciprocating carriage in such a manner that for sawing shingles, the bolts will be given the desired obliquity before they are brought up to the saw as will be hereinafter described.

To enable those skilled in the art to fully understand my invention I will proceed to describe the construction and operation of the machine.

The frame for supporting the several parts about to be described is represented by A, in the three figures on the top of which is placed in suitable grooves, a reciprocating carriage B, that receives its movement from racks $a$, and pinions $b$, seen in Fig. 1, which latter may be driven by a vibrating pinion $c$, on the top of a vibrating belt shaft $d$, that engages with a segment spur wheel $e$, so as to give to it a right and left motion, or any other suitable device may be employed that will answer the same ends, viz., to communicate from some prime mover, a regular alternate reciprocatory movement to this carriage B. Underneath the carriage B, and in the middle of the frame A, is arranged on a perpendicular shaft C, a horizontal circular saw C′, which is on a plane with the horizontal top of the frame A. This saw is driven by a belt placed over the pulley, represented on its shaft C, and cuts the bolts at each motion of the carriage as will be hereinafter shown.

D, D represent two inclined planes arranged under the saw on each side of its shaft for conducting the shingles or boards as they are cut by the saw away from the machine.

A suitable device will be attached to the mechanism for operating the carriage, for stopping and starting the same, at pleasure, without throwing off belts for this purpose.

In each end of the carriage B, are placed the head blocks E, E, E, E, which can be adjusted to or from each other by the set screws *g, g, g, g*, which clamp them to the transverse bars of the carriage as represented in the drawings, they may thus be made to receive bolts of various lengths. Between each pair of these head blocks E, E, the bolts, from which shingles or slabs are to be cut, are placed and clamped between saw toothed jaws *h, h*, each pair of which are operated at a proper time, so as to open and release the bolt and then grasp it again and return it to the saw for cutting off another slab or shingle, as the case may be. In order to do this automatically, the clamping jaws *h, h*, are each acted upon by a strong spring for forcing them into the bolt, and holding the bolt firmly between the head blocks E. The springs being attached to the serrated jaws in a suitable manner, they are connected with rods which project out through the end transverse bars of the carriage and are held by rack arms *i, i*, that are each attached by joints to a lever *j*, having its fulcrum between the pivots of the arms in the ends of the carriage B. The arms *i, i*, have rack teeth on them for allowing the head blocks with their clamps to be extended or contracted for longer or shorter bolts. Each end of the carriage is provided with three clamps for holding the bolts between the head blocks precisely alike in their construction and operation. On each end cross bar of the frame A, is suitably pivoted a rack plate *k*, (Fig. 2) that acts alternately upon the lower ends of levers *j*, when the carriage is moved to the ends of the frame, and releases the bolts from the jaws or clamps *h, h*, allows the bolt to fall on a table J, then as the carriage starts to return, the plate *k* relieves the lever *j*, when the clamps will again firmly grip and hold the bolt in a proper manner for receiving another cut.

The tables J, J, are placed in suitable frames at each end of the main frame A, they are made adjustable so that they may be set for various thicknesses of work and these two tables are arranged in such a relation to the reciprocating carriage and head blocks that they receive the bolts when the bolts are released from the clamps, and act as gages for presenting the work properly to the saw. On each table J, J, and at suitable distances apart are placed blocks K, K, which have an alternate reciprocating motion, obtained from the carriage B, in the following manner, a pawl *m*, is placed on one side of carriage B, which operates a cam that gives a vibratory motion to rod N, (Fig. 2) and from the ends of this rod to sliding bars J', J', are connecting rods *n, n*. Now as the carriage moves back and forth over the frame A, the bars, with their blocks attached to them are moved first from one side and then to the other of tables J. The blocks K, K, can be adjusted and set farther apart or brought nearer together according to the length of the work; and these blocks are used only when shingles are to be cut, in the machine for giving the bolts the required obliquity before they are presented to the saw.

In operating this machine for cutting shingles, the bolts are clamped between the head blocks in each end of carriage B, and the vibrating rack plates are set up against stop pins in a proper position for acting upon the levers *j, j*. The saw C', is put in motion and the tables J, J, being adjusted in a suitable manner according to the thickness of the stuff to be cut. The blocks K, K, are set at the proper distance apart and the carriage is started with one bolt in each end as described. As the carriage proceeds to one end of the frame A, and immediately the saw passes through one bolt, the other bolt is released by the withdrawal of clamps *h, h*, drops on the table (J) under it, one end resting down on the table, and the other resting on one of the blocks K, as represented in Fig. 3, of the drawings; this gives an inclination to the bolt and in this state the clamps grip it again in the return movement of the carriage, so that the saw will cut the bolt obliquely—as the carriage moves forward to the opposite end of the frame. When this bolt returns back to the table J, and is again released from the cariage, the position of the blocks K, will have been changed and the smaller end of the bolt will now be received on the opposite block, so that it will be presented to the saw in such a manner that it will be cut by the saw in a parallel plane with its top face. In this manner the bolts receive an alternate oblique and straight cut at each movement of the carriage, and at each movement of the carriage the saw cuts through one of the bolts; and they are alternately released, gaged and gripped by the devices hereinbefore described without stopping the movement of the machine.

For cutting slabs or planks for boxes which are to be of an equal width from end to end, the blocks K should be removed from the tables J, J, otherwise the operations for releasing the bolts, gaging, and again gripping them are the same as above described for sawing shingles.

Having thus described my invention what I claim and desire to secure by Letters Patent, is—

1. The combination with a reciprocating carriage B, and saw C', of the adjustable head blocks E, E, E, E, their clamps *h, h*, arranged and operating automatically, substantially as set forth, and the adjustable tables J, J, all arranged in the manner and for the purposes herein described.

2. In combination with the tables J, J, and carriage B, when the machine is used for sawing shingles, of the pawl m, vibrating rod N, connecting rods n, n, bars J', J', with their adjustable blocks K, K, arranged and operating substantially in the manner herein described and represented.

E. T. WHEELER.

Witnesses:
 JOHN C. WADE,
 L. W. MARBLE,
 BENJ. H. ROUNDS.